United States Patent Office 2,856,331
Patented Oct. 14, 1958

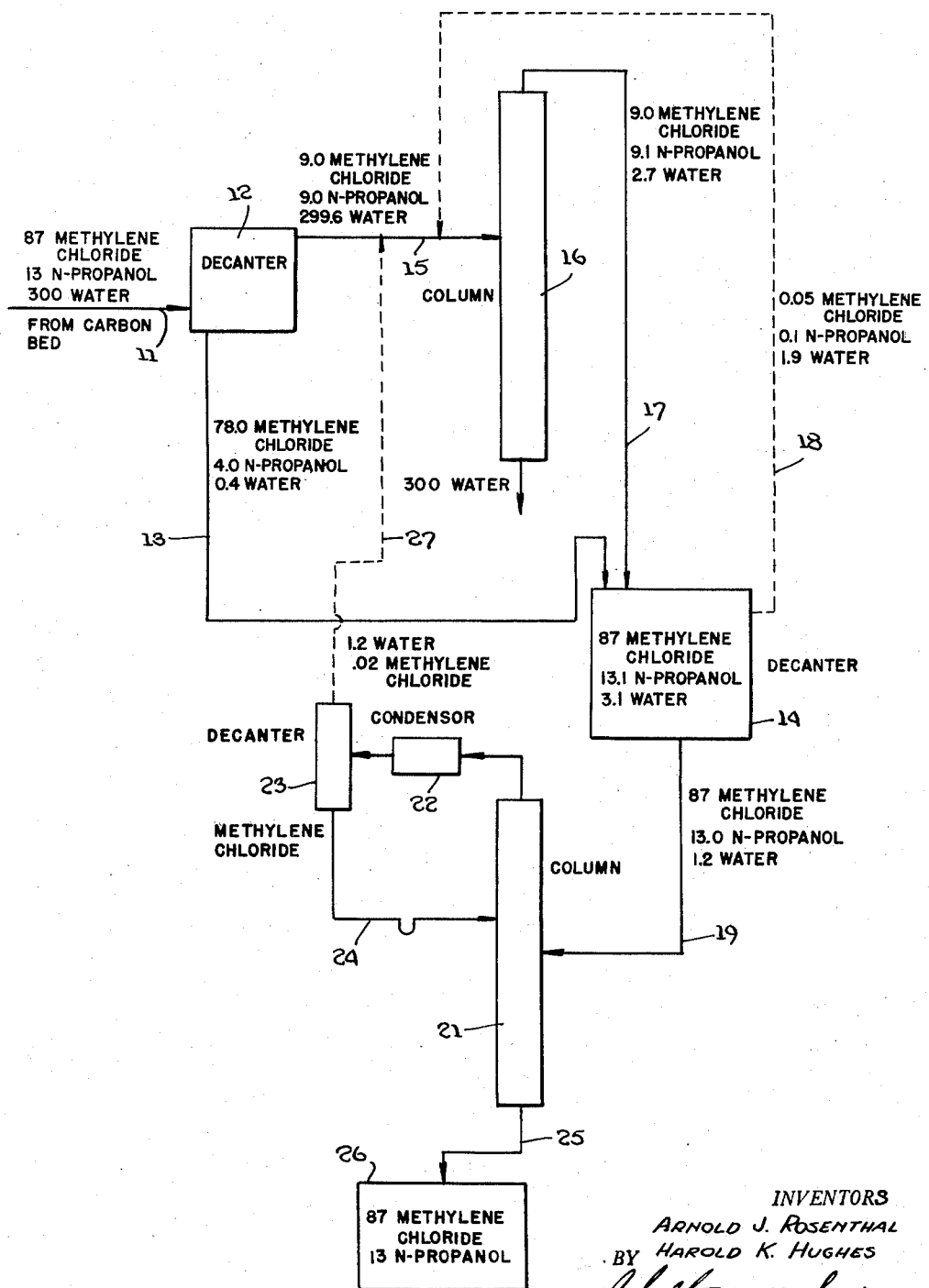

2,856,331

METHOD OF DEHYDRATING METHYL CHLORIDE, AND MIXTURES OF METHYL CHLORIDE WITH LOWER ALIPHATIC ALCOHOLS

Arnold J. Rosenthal, Madison, and Harold K. Hughes, Summit, N. J., assignors to Celanese Corporation of America, New York, N. Y., a corporation of Delaware Application July 14, 1954, Serial No. 443,246

18 Claims. (Cl. 202—42)

This invention relates to a dehydration process and relates more particularly to a dehydration process for removing water from solvents including methylene chloride and mixtures of methylene chloride with lower aliphatic alcohols.

Methylene chloride, alone and in admixture with lower aliphatic alcohols, possesses excellent solvent properties for organic acid esters of cellulose and may be employed for dissolving the said esters to form a spinning solution or dope. During the spinning of these solutions into air or other evaporative medium, the vapors of methylene chloride and the alcohol may be readily removed from the air by adsorption in activated carbon, or the like, and recovered by stripping the activated carbon with steam. The recovered solvent, however, contains an appreciable amount of water derived from the steam used in stripping so that it separates into two phases, both containing at least some methylene chloride and alcohol, where alcohol is used, and is not suited for reuse in this condition. While it is possible to remove the water from the methylene chloride phase of the recovered solvent by treatment with dehydrating agents such as alumina, silica gel or the like, the use of these expedients involves considerable expense. The use of such agents for removing the water from the aqueous phase is, of course, prohibitively expensive. To discard the aqueous phase would also involve additional expense to the process owing to the loss of solvent in this phase.

It is an important object of this invention to provide a dehydration process which will be free from the foregoing and other disadvantages and which will be especially simple and efficient.

Another object of this invention is to provide a dehydration process for removing water from solvents including methylene chloride and mixtures of methylene chloride with lower aliphatic alcohols.

Other objects of this invention will be apparent from the following detailed description and claims.

According to the present invention, it has been found that it is possible to remove water from the solvent including methylene chloride and mixtures of methylene chloride with lower aliphatic alcohols, together with such large amounts of water that two phases are formed, by a process which involves first the physical separation of these phases and includes, as one step of the process, a distillation operation of the aqueous phase whereby an azeotrope of methylene chloride and water will pass overhead. Through the use of this process it is possible to carry out the dehydration of the solvents quickly and with a minimum of cost. It is also possible to recover substantially all the solvent.

The drawing shows diagrammatically one embodiment of this invention.

In applying the process of this invention to the removal of water from methylene chloride mixed with large amounts of water, the mixture is first entered into a decanter where it separates into an upper aqueous phase and a lower methylene chloride phase. The aqueous phase is withdrawn and may, if desired, be distilled to recover the methylene chloride present therein as an azeotrope of water and methylene chloride. Such azeotrope may be combined with the methylene chloride phase from the decanter, preferably after the azeotrope has been condensed and the aqueous phase in the condensate withdrawn. In some cases the methylene chloride obtained in this manner may be used without further dehydration. However, where the water content of this water-saturated methylene chloride is too high for its intended use, the methylene chloride saturated with water is introduced into a distillation column and an azeotrope containing 98.5% by weight of methylene chloride and 1.5% by weight of water is distilled overhead at a temperature of about 38.1° C. under atmospheric pressure. The vapors coming overhead are condensed and separate into two phases since only about 0.2% by weight of water can dissolve in the methylene chloride. The aqueous phase is removed and may, if desired, be distilled again to recover the methylene chloride therein. The methylene chloride phase is returned to the distillation and distillation is continued until the water content of the methylene chloride has been reduced to the desired value.

In applying the process of this invention to the removal of water from a mixture of methylene chloride and methanol together with large amounts of water, the mixture is first entered into a decanter where it separates into two phases. In this case, owing to the presence of the alcohol, the upper aqueous phase will contain larger amounts of methylene chloride than if the alcohol were absent. The upper aqueous phase will also contain a relatively high proportion of the methanol. Similarly, the lower methylene chloride phase will contain, in addition to the methanol, larger amounts of water than if the methanol were absent. The two phases are separated and the upper, or aqueous, phase is distilled. The first distillation cut coming overhead will be an azeotrope of methylene chloride and water, which, as pointed out above will if condensed, separate into two phases permitting the major portion of the water to be removed as the upper aqueous phase. The next distillation cut will be substantially anhydrous methanol. The bulk of the water will remain in the distillation column. The first distillation cut, or the methylene chloride phase of the first distillation cut, and the second distillation cut are combined with the methylene chloride phase from the initial decanter to give a solvent which contains relatively small amounts of water and which may be employed for certain purposes without further treatment. To reduce the quantity of water in this solvent mixture to still lower levels, the solvent mixture is distilled whereby an azeotrope of methylene chloride and water will come overhead. On condensation, the azeotrope will separate into two phases as pointed out above, and the lower methylene chloride phase may be returned to the distillation column and distillation continued until the amount of water has been reduced to the desired level.

When a solvent comprising a mixture of methylene chloride and ethanol together with large amounts of water is treated in accordance with this invention, the procedural steps are the same as when the alcohol is methanol. However, in this case the distillation of the aqueous phase from the decanter proceeds in a somewhat different manner. The first cut during this distillation comprises an azeotrope of methylene chloride and water as in the case when the alcohol is methanol. However, the second cut is the ethyl alcohol-water azeotrope containing 95% by weight of ethyl alcohol. When the first cut or the methylene chloride phase thereof and the second cut are mixed with the methylene chloride phase from the decanter, the solvent obtained has a higher proportion of water than when methanol is employed so that an azeotropic distillation to remove water is more frequently necessary with this solvent.

In the case of treating the solvent comprising a mixture of methylene chloride and isopropanol together with large amounts of water, the initial treatments are the same as in the case where the alcohol is methanol. That is, the solvent is entered into a decanter where it separates into two phases, a lower methylene chloride phase containing, in addition to the methylene chloride, isopropanol and a small amount of water, and an upper aqueous phase containing, in addition to water, isopropanol and methylene chloride. The lower and upper phases are separated and the upper aqueous phase is distilled. The first cut from this distillation is the azeotrope of methylene chloride and water. The next cut from this distillation is the azeotrope of isopropanol and water which contains 88% by weight of isopropanol and boils at 80.4° C. under atmospheric pressure. Owing to the large quantity of water in the isopropanol-water azeotrope, when the first cut, or the methylene chloride phase of the first cut, and the second cut are combined and added to the methylene chloride phase from the decanter, the solvent obtained has present therein a relatively high percentage of water. For most purposes, the removal of at least a portion of this water is necessary to put the solvent in condition for use. The removal of the water may be readily carried out by distilling the solvent whereby an azeotrope of methylene chloride and water will distill overhead, condensing the said azeotrope whereby it will separate into two phases and returning the methylene chloride phase to the distillation column. The aqueous phase, which is saturated with methylene chloride, may be combined with the aqueous phase from the decanter to recover the methylene chloride therein. This operation is continued until the water content of the solvent has been reduced to the desired level.

It is also possible to combine the first two distillation cuts, or the methylene chloride phase of the first cut, and the second cut and distill the mixture so formed whereby an azeotrope of methylene chloride and water is distilled overhead. This azeotrope is condensed and separates into two phases, the lower methylene chloride phase of which is returned to the distillation zone and the upper aqueous phase of which may be combined with the aqueous phase from the decanter to recover the methylene chloride therein. This distillation is continued until the water content of the mixture is reduced to the desired level. Then, the mixture is combined with the methylene chloride phase from the first decanter to give a product which has only a relatively small amount of water present therein. When the water content of the solvent prepared in this manner is not excessive for its intended use, this last procedure is somewhat more efficient than the procedure in which the entire volume of solvent is distilled since it eliminates the necessity for heating all the solvent to the distillation temperature.

When the process of this invention is applied to the solvent comprising methylene chloride and normal propanol, together with large amounts of water, the procedure must be somewhat modified. As the first step in the process, the solvent is entered into a decanter where it separates into a lower, or methylene chloride, phase containing methylene chloride together with normal propanol and some water, and an upper, or aqueous, phase containing water together with some normal propanol and methylene chloride. The upper and lower phases are separated from one another and the upper phase is distilled. The first cut during this distillation comprises the azeotrope of methylene chloride and water. The second cut during this distillation comprises the azeotrope of normal propanol and water which contains 72% by weight of normal propanol and boils at 88.1° C. under atmospheric pressure. The water content of this last azeotrope is so high that when the first cut or the methylene chloride phase of the first cut and the second are combined with the methylene chloride phase from the decanter, the solvent mixture formed will separate into two phases, a lower methylene chloride phase containing some water and normal propanol and an upper aqueous phase containing some normal propanol and methylene chloride. This solvent mixture is entered into a second decanter where the two phases are separated from one another. The upper aqueous phase is mixed with the upper aqueous phase from the first decanter to recover the methylene chloride and normal propanol therein. The lower methylene chloride phase, which contains a relatively large amount of water, may then be entered into a second distillation column and distilled whereby an azeotrope of methylene chloride and water will come overhead. This azeotrope, on condensation, separates into two phases, the lower methylene chloride phase of which is returned to the distillation column and the upper aqueous phase of which may be mixed with the aqueous phase from the first decanter to recover the methylene chloride present therein. Distillation is continued until the water content of the solvent has been reduced to the desired value.

Instead of mixing the first two cuts from the first distillation with the methylene chloride phase from the first decanter before distilling the same, it is also possible to combine the first two cuts from the first distillation, or the methylene chloride phase of the first cut, and the second cut and distill the mixture so formed. The first cut from such distillation will be the azeotrope of methylene chloride and water which is condensed and separates into two phases. The upper, or aqueous, phase is mixed with the upper aqueous phase from the first decanter to recover the methylene chloride present therein and the lower methylene chloride phase is returned to the distillation column. The distillation is continued until the water content of the mixture has been reduced to the desired value whereupon the mixture is blended with the methylene chloride phase from the first decanter. While the use of this procedure will not yield an anhydrous solvent, it does produce a solvent having a low water content which is suited for many purposes and this procedure offers the advantage that it does not require heating the bulk of the solvent to the distillation temperature.

This invention is generally applicable to the treatment of solvents containing between about 80 and 99% by weight of methylene chloride and between about 1 and 20% by weight of a lower aliphatic alcohol, with which solvents there has been mixed sufficient water to cause the mixture to separate into two phases. It is especially useful where for each 100 parts by weight of solvent there are present more than about 100 and preferably between about 200 and 500 parts by weight of water.

The following examples are given to illustrate this invention further.

*Example 1*

A mixture containing 90 parts by weight of methylene chloride, 10 parts by weight of methanol and 300 parts by weight of water, obtained by steaming an activated carbon bed that has been used to absorb the solvent vapors, is entered into a decanter where it separates into two phases. The lower, or methylene chloride, phase which contains 82.5 parts by weight of methylene chloride, 0.2 part by weight of methanol and 0.2 part by weight of water is withdrawn from the decanter. The upper, or aqueous, phase, which contains 299.8 parts by weight of water, 7.5 parts by weight of methylene chloride and 9.8 parts by weight of methanol is also withdrawn from the decanter and entered into a distillation column where it is distilled. The first cut taken at a temperature of 38° C., which is the azeotrope of methylene chloride and water, and the second cut taken at a temperature of 65° C., which is methanol, are combined and together include 7.5 parts by weight of methylene chloride, 9.8 parts by weight of methanol and 0.2 part by weight of water. These two cuts are added to the methylene chloride phase from the first decanter to give a product containing 90 parts by weight of methylene chloride, 10 parts by weight of methanol and 0.4 part by weight of water.

*Example II*

A mixture containing 87 parts by weight of methylene chloride, 13 parts by weight of ethanol, and 300 parts by weight of water, obtained by steaming an activated carbon bed that has been used to absorb the solvent vapors, is entered into a decanter where it separates into two phases. The lower, or methylene chloride, phase which contains 77.9 parts by weight of methylene chloride, 2.0 parts by weight of methanol and 0.2 part by weight of water is withdrawn from the decanter. The upper, or aqueous, phase which contains 299.8 parts by weight of water, 9.1 parts by weight of methylene chloride and 11.0 parts by weight of ethanol is also withdrawn from the decanter and entered into a distillation column where it is distilled. The first cut, which is the azeotrope of methylene chloride and water, and the second cut, which is the azeotrope of ethanol and water, are combined and together include 9.1 part by weight of methylene chloride, 11.0 parts by weight of ethanol and 0.7 part by weight of water. These two cuts are added to the methylene chloride phase from the decanter to give a product containing 87 parts by weight of methylene chloride, 13 parts by weight of ethanol and 0.9 part by weight of water.

*Example III*

A mixture containing 87 parts by weight of methylene chloride, 13 parts by weight of isopropanol and 300 parts by weight of water, obtained by steaming an activated carbon bed that has been used to absorb the solvent vapors, is entered into a decanter where it separates into two phases. The lower, or methylene, chloride phase which contains 78.1 parts by weight of methylene chloride, 2.8 parts by weight of isopropanol and 0.4 part by weight of water is withdrawn from the decanter. The upper, or aqueous, phase which contains 299.6 parts by weight of water, 8.9 parts by weight of methylene chloride and 10.2 parts by weight of isopropanol is also withdrawn from the decanter and distilled. The first cut, which is the azeotrope of methylene chloride and water, and the second cut, which is the azeotrope of isopropanol and water, are combined and together include 8.9 parts by weight of methylene chloride, 10.2 parts by weight of isopropanol and 1.4 parts by weight of water. These two cuts are added to the methylene chloride phase from the decanter to give a product containing 87 parts by weight of methylene chloride, 13 parts by weight of isopropanol and 1.8 parts by weight of water. This product is entered into a second distillation column where it is distilled to give a cut comprising the azeotrope of methylene chloride and water. This cut is condensed and entered into a second decanter from which the lower methylene chloride phase is returned to the distillation column while the upper aqueous phase is drawn off and mixed with the aqueous phase from the first decanter. Distillation is continued in this manner to produce an anhydrous product containing 87 parts by weight of methylene chloride and 13 parts by weight of isopropanol. During this distillation, the aqueous phase drawn from the second decanter contains a total 1.8 parts by weight of water and 0.03 part by weight of methylene chloride.

*Example IV*

Reference is had to the attached drawing.

A mixture containing 87 parts by weight of methylene chloride, 13 parts by weight of normal propanol and 300 parts by weight of water, obtained by steaming an acti- vated carbon bed that has been used to absorb the solvent vapors, is entered through a conduit 11 into a decanter 12 where it separates into two phases. The lower, or methylene chloride, phase which contains 78.0 parts by weight of methylene chloride, 4.0 parts by weight of normal propanol and 0.4 part by weight of water is withdrawn from the decanter 12 through a conduit 13 into a second decanter 14. The upper, or aqueous, phase which contains 299.6 parts by weight of water, 9.0 parts by weight of methylene chloride and 9.0 parts by weight of normal propanol is also withdrawn from the decanter 12 and entered through a conduit 15 into a distillation column 16 where it is distilled. The first cut, which is the azeotrope of methylene chloride and water, and the second cut, which is the azeotrope of normal propanol and water, are combined and together include 9.0 parts by weight of methylene chloride, 9.1 parts by weight of normal propanol and 2.7 parts by weight of water. The first and second cuts pass through a conduit 17 into the second decanter 14 to give a mixture therein containing 87 parts by weight of methylene chloride, 13.1 parts by weight of normal propanol and 3.1 parts by weight of water, which mixture separates into two phases. The upper, or aqueous, phase which contains 1.9 parts by weight of water, 0.05 part by weight of methylene chloride and 0.1 part by weight of normal propanol is returned through a conduit 18 to the distillation column 16. The lower, or methylene chloride, phase which contains 87 parts by weight of methylene chloride, 13.0 parts by weight of normal propanol and 1.2 parts by weight of water is withdrawn from the decanter 14 through a conduit 19 into a second distillation column 21 where it is distilled. The vapor passing overhead, which is the azeotrope of methylene chloride and water, is condensed in a condenser 22 and then flows into a third decanter 23 from which the lower methylene chloride phase is returned to the distillation column 21 through a conduit 24. The distillation is continued until a substantially anhydrous residue containing 87 parts by weight of methylene chloride and 13 parts by weight of normal propanol can be withdrawn from the distillation column 21 through a conduit 25 into a receiver 26. During this distillation, the upper, or aqueous, phase from the third decanter 23, which includes a total of 1.2 parts by weight of water and 0.02 part by weight of methylene chloride, is returned to the first distillation column through a conduit 27.

It is to be understood that the foregoing detailed description is given merely by way of illustration and that many variations may be made therein without departing from the spirit of our invention.

Having described our invention, what we desire to secure by Letters Patent is:

1. Process for the dehydration of solvents comprising methylene chloride with a lower aliphatic alcohol together with sufficient water to cause the mixture to separate into two phases, which comprises separating the upper aqueous phase from the lower methylene chloride phase, distilling the upper aqueous phase whereby an azeotrope of methylene chloride and water will distill overhead initially, and continuing the distillation whereby the alcohol will distill overhead.

2. Process for the dehydration of solvents comprising between about 80 and 99% by weight of methylene chloride with between about 1 and 20% by weight of a lower aliphatic alcohol together with sufficient water to cause the mixture to separate into two phases, which comprises separating the upper aqueous phase from the lower methylene chloride phase, distilling the upper aqueous phase whereby an azeotrope of methylene chloride and water will distill overhead initially, and continuing the distillation whereby the alcohol will distill overhead.

3. Process for the dehydration of solvents comprising methylene chloride with a lower aliphatic alcohol together with sufficient water to cause the mixture to separate into two phases, which comprises separating the upper aqueous phase from the lower methylene chloride phase, distilling the upper aqueous phase whereby an azeotrope of methylene chloride and water will distill overhead initially, continuing the distillation whereby the alcohol will distill overhead, and combining the methylene chloride and alcohol obtained by the distillation with the methylene chloride phase from the separation.

4. Process for the dehydration of solvents comprising methylene chloride with a lower aliphatic alcohol together with sufficient water to cause the mixture to separate into two phases, which comprises separating the upper aqueous phase from the lower methylene chloride phase, distilling the upper aqueous phase whereby an azeotrope of methylene chloride and water will distill overhead initially, continuing the distillation whereby the alcohol will distill overhead, combining the methylene chloride and alcohol obtained by the distillation with the methylene chloride phase from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

5. Process for the dehydration of solvents comprising between about 80 and 99% by weight of methylene chloride with between about 1 and 20% by weight of a lower aliphatic alcohol together with sufficient water to cause the mixture to separate into two phases, which comprises separating the upper aqueous phase from the lower methylene chloride phase, distilling the upper aqueous phase whereby an azeotrope of methylene chloride and water will distill overhead initially, continuing the distillation whereby the alcohol will distill overhead, combining the methylene chloride and alcohol obtained by the distillation with the methylene chloride phase from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

6. Process for the dehydration of solvents comprising methylene chloride and methanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby the methanol will distill overhead, and adding the methylene chloride and the methanol from the distillation to the lower methylene chloride phase from the separation.

7. Process for the dehydration of solvents comprising methylene chloride and methanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby the methanol will distill overhead, adding the methylene chloride cut and the methanol cut from the distillation to the lower methylene chloride phase from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

8. Process for the dehydration of solvents comprising between about 80 and 99% by weight of methylene chloride and between about 1 and 20% by weight of methanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby the methanol will distill overhead, adding the methylene chloride cut and the methanol cut from the distillation to the lower methylene chloride phase from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

9. Process for the dehydration of solvents comprising methylene chloride and ethanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of ethanol and water will distill overhead, and adding the methylene chloride and ethanol from the distillation to the methylene chloride phase from the separation.

10. Process for the dehydration of solvents comprising methylene chloride and ethanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of ethanol and water will distill overhead, adding the methylene chloride cut and the ethanol cut from the distillation to the methylene chloride cut from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

11. Process for the dehydration of solvents comprising between about 80 and 99% by weight of methylene chloride and between about 1 and 20% by weight of ethanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of ethanol and water will distill overhead, adding the methylene chloride cut and ethanol cut from the distillation to the methylene chloride cut from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

12. Process for the dehydration of solvents comprising methylene chloride and isopropanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of isopropanol and water will distill overhead, and adding the methylene chloride and isopropanol from the distillation to the methylene chloride phase from the separation.

13. Process for the dehydration of solvents comprising methylene chloride and isopropanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of isopropanol and water will distill overhead, adding the methylene chloride cut and the isopropanol cut from the distillation to the methylene chloride cut from the separation, distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

14. Process for the dehydration of solvents comprising between about 80 and 99% by weight of methylene chloride and between about 1 and 20% by weight of isopropanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of isopropanol and water will distill overhead, adding the methylene chloride cut and the isopropanol cut from the distillation to the methylene chloride cut from the separation distilling the solvent so obtained whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

15. Process for the dehydration of solvents comprising methylene chloride and normal propanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of normal propanol and water will distill overhead, and adding the methylene chloride and normal propanol from the distillation to the methylene chloride phase from the separation.

16. Process for the dehydration of solvents comprising methylene chloride and normal propanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of normal propanol and water will distill overhead, adding the methylene chloride cut and the normal propanol cut from the distillation to the methylene chloride phase from the separation whereby the product will separate into an upper aqueous phase and a lower methylene chloride phase, and separating the phases.

17. Process for the dehydration of solvents comprising methylene chloride and normal propanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of normal propanol and water will distill overhead, adding the methylene chloride cut and the normal propanol cut from the distillation to the methylene chloride phase from the separation whereby the product will separate into an upper aqueous phase and a lower methylene chloride phase, separating the phases, distilling the lower methylene chloride phase whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

18. Process for the dehydration of solvents comprising between about 80 and 99% by weight of methylene chloride and between about 1 and 20% by weight of normal propanol together with sufficient water to cause the mixture to separate into two phases, which comprises separating the upper aqueous phase from the lower methylene chloride phase, distilling the aqueous phase whereby an azeotrope of methylene chloride and water will distill overhead, continuing the distillation whereby an azeotrope of normal propanol and water will distill overhead, adding the methylene chloride cut and the normal propanol cut from the distillation to the methylene chloride phase from the separation whereby the product will separate into an upper aqueous phase and a lower methylene chloride phase, separating the phases, distilling the lower methylene chloride phase whereby an azeotrope of methylene chloride and water will distill overhead, condensing the azeotrope whereby it will separate into a lower methylene chloride phase and an upper aqueous phase, returning the lower methylene chloride phase to the distillation, and continuing the distillation until the water content of the solvent has been reduced to the desired level.

References Cited in the file of this patent

UNITED STATES PATENTS

| | | |
|---|---|---|
| 1,870,854 | Lewis | Aug. 9, 1932 |
| 2,356,785 | Hammond | Aug. 28, 1944 |
| 2,393,367 | Hammond | Jan. 22, 1946 |
| 2,406,195 | Cass | Aug. 20, 1946 |
| 2,582,214 | Twigg | Jan. 8, 1952 |
| 2,658,088 | Landau | Nov. 3, 1953 |
| 2,800,513 | Hall et al. | July 23, 1957 |

UNITED STATES PATENT OFFICE
CERTIFICATE OF CORRECTION

Patent No. 2,856,331                                      October 14, 1958

Arnold J. Rosenthal et al.

It is hereby certified that error appears in the above numbered patent requiring correction and that the said Letters Patent should read as corrected below.

In the heading to the drawing, lines 2 and 3, and in the heading to the printed specification, lines 2 and 3, in the title of invention, for "METHYL", each occurrence, read -- METHYLENE --.

Signed and sealed this 3rd day of March 1959.

(SEAL)
Attest:

KARL H. AXLINE
Attesting Officer

ROBERT C. WATSON
Commissioner of Patents